US012786081B2

(12) United States Patent
Abdelhalim et al.

(10) Patent No.: US 12,786,081 B2
(45) Date of Patent: Nov. 3, 2026

(54) SCHEDULING TELEMETRY DATA COLLECTION FOR AN INFORMATION HANDLING SYSTEM

(71) Applicant: Dell Products L.P., Round Rock, TX (US)

(72) Inventors: Alan Helmy Abdelhalim, Pflugerville, TX (US); Jacob Vincent Mink, Cedar Park, TX (US); Yves Christian Dolce, Redmond, WA (US)

(73) Assignee: Dell Products L.P., Round Rock, TX (US)

( * ) Notice: Subject to any disclaimer, the term of this patent is extended or adjusted under 35 U.S.C. 154(b) by 9 days.

(21) Appl. No.: 19/171,540

(22) Filed: Apr. 7, 2025

(65) Prior Publication Data

US 2026/0312893 A1 Oct. 8, 2026

(51) Int. Cl.
*G06F 15/173* (2006.01)
*H04L 43/02* (2022.01)
*H04L 43/08* (2022.01)

(52) U.S. Cl.
CPC .............. *H04L 43/02* (2013.01); *H04L 43/08* (2013.01)

(58) Field of Classification Search
CPC ................................ H04L 43/02; H04L 43/08
See application file for complete search history.

(56) References Cited

U.S. PATENT DOCUMENTS 11,405,141 B2 * 8/2022 Jas ...................... G06F 16/2365
11,501,013 B1 * 11/2022 Das ......................... G06F 21/55
2023/0259382 A1 * 8/2023 Van Os ............... G06F 9/45558 718/1

* cited by examiner

*Primary Examiner* — Duyen M Doan
(74) *Attorney, Agent, or Firm* — McDermott Will & Schulte LLP

(57) ABSTRACT

Scheduling telemetry data collection for an information handling system, including receiving, from a client computing module, a request for particular telemetry data; in response to the request, accessing a cache, the cache including a plurality of telemetry data; determining that a difference between a current time and the timestamp of the particular telemetry data is greater than a timeliness threshold, and in response: identifying the time of last request associated with the particular client ID and the particular datatype ID; determining an elapsed time between the time of last request and the timestamp of the request; determining that the collection frequency is not greater than the elapsed time, and in response: collecting the particular telemetry data from one or more computing hardware; providing the collected particular telemetry data to the client computing module.

20 Claims, 3 Drawing Sheets

SCHEDULING TELEMETRY DATA COLLECTION FOR AN INFORMATION HANDLING SYSTEM

BACKGROUND

Field of the Disclosure

The disclosure relates generally to an information handling system, and in particular, scheduling telemetry data collection for an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Telemetry data collection involves the gathering and transmission of data from various sensors and devices to a central system for monitoring and analysis. This data can include information on system performance, environmental conditions, and user interactions. Telemetry is widely used in fields such as aerospace, healthcare, and IT to ensure systems are functioning correctly and to predict potential issues. By analyzing telemetry data, organizations can make informed decisions, improve efficiency, and enhance overall system reliability.

SUMMARY

Innovative aspects of the subject matter described in this specification may be embodied in a method of scheduling telemetry data collection for an information handling system, including receiving, from a client computing module, a request for particular telemetry data, the request including a particular client identifier (ID) of the client computing module, a particular datatype ID of the particular telemetry data, a timeliness threshold of the particular telemetry data, and a timestamp of the request; in response to the request, accessing a cache, the cache including a plurality of telemetry data, each plurality of telemetry data associated with a respective timestamp; determining that a difference between a current time and the timestamp of the particular telemetry data is greater than the timeliness threshold, and in response: accessing a database, the database including: for each telemetry data, a collection frequency associated with the telemetry data; for each combination of client ID of a plurality of client IDs and datatype ID of a plurality of datatype IDs, a time of last request by the client ID for the datatype ID of the telemetry data; identifying, based on the database, the time of last request associated with the particular client ID and the particular datatype ID; determining an elapsed time between the time of last request and the timestamp of the request; determining that the collection frequency is not greater than the elapsed time, and in response: collecting the particular telemetry data from one or more computing hardware; providing the collected particular telemetry data to the client computing module; and performing, at the client computing module and based on the collected particular telemetry data, a remediation action at the computing hardware of the information handling system.

Other embodiments of these aspects include corresponding systems, apparatus, and computer programs, configured to perform the actions of the methods, encoded on computer storage devices.

These and other embodiments may each optionally include one or more of the following features. For instance, in response to determining that the collection frequency is not greater than the elapsed time, updating the cache with the collected particular telemetry data and the timestamp of the collected particular telemetry data. Updating the database to indicate the timestamp of the request for the client ID and the datatype ID. Determining that a difference between a current time and the timestamp of the particular telemetry data is less than the timeliness threshold, and in response, providing the particular telemetry data from the cache to the client computing module. Determining that the collection frequency is greater than the elapsed time, and in response, providing an error signal to the client computing module. Determining an interval of each pair of consecutive requests from the client computing device from a sliding time window; comparing the interval of each pair of consecutive requests to an interval threshold; determining a number of pairs of consecutive requests of the sliding time window that are greater than the interval threshold; comparing the number of pairs of consecutive requests of the sliding time window to a quantity threshold; and determining that the number of pairs of consecutive request of the sliding time window is less than the quantity threshold, and in response, collecting the particular telemetry data from one or more computing hardware. Determining an interval of each pair of consecutive requests from the client computing device from a sliding time window; comparing the interval of each pair of consecutive requests to an interval threshold; determining a number of pairs of consecutive requests of the sliding time window that are greater than the interval threshold; comparing the number of pairs of consecutive requests of the sliding time window to a quantity threshold; and determining that the number of pairs of consecutive request of the sliding time window is greater than the quantity threshold, and in response, rejecting additional requests from the client computing device.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
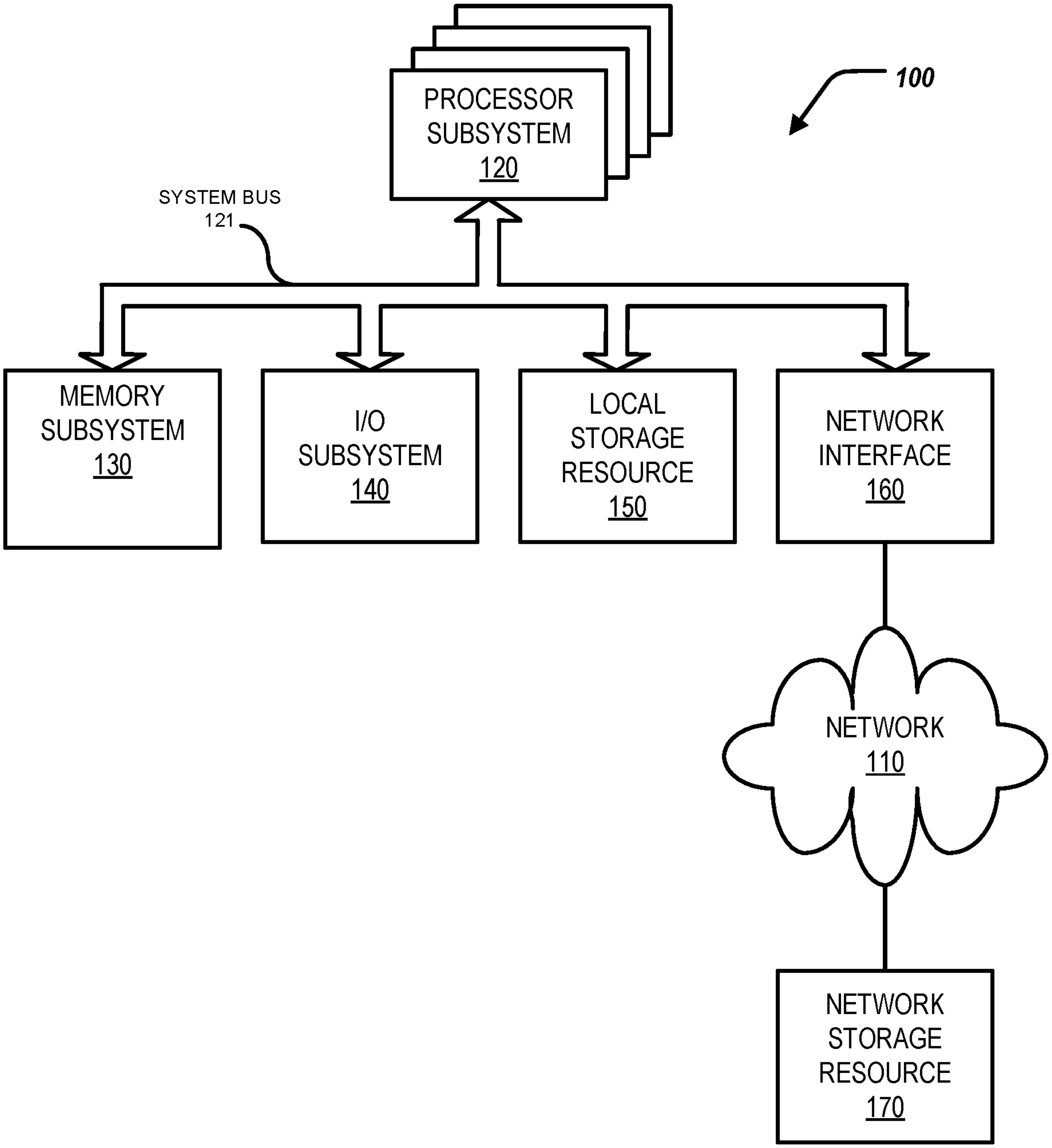
FIG. 1 is a block diagram of selected elements of an embodiment of an information handling system.

This disclosure discusses methods and systems for scheduling telemetry data collection for an information handling system. In short, computing applications using a common telemetry agent may aim to collect data types periodically but might do so inappropriately. Some applications treat the telemetry agent as a library, making a series of on-demand calls managed by their own timers. This approach reduces the telemetry agent's ability to optimize the collection of telemetry data requested by multiple applications. The application may be aware of the periodic collection of the telemetry data and also may attempt to bypass such collection frequency. The application may use a timer to initiate discrete on-demand telemetry data requests ("calls"), thereby causing the negative impact that the telemetry agent aims to prevent. The present invention implements a protection algorithm to detect accidental or intentional misuse of telemetry data requests. This prevents circumvention of system-level telemetry collection strategies, heuristics, and safeguards.

Specifically, this disclosure discusses a system and a method for scheduling telemetry data collection for an information handling system, including receiving, from a client computing module, a request for particular telemetry data, the request including a particular client identifier (ID) of the client computing module, a particular datatype ID of the particular telemetry data, a timeliness threshold of the particular telemetry data, and a timestamp of the request; in response to the request, accessing a cache, the cache including a plurality of telemetry data, each plurality of telemetry data associated with a respective timestamp; determining that a difference between a current time and the timestamp of the particular telemetry data is greater than the timeliness threshold, and in response: accessing a database, the database including: for each telemetry data, a collection frequency associated with the telemetry data; for each combination of client ID of a plurality of client IDs and datatype ID of a plurality of datatype IDs, a time of last request by the client ID for the datatype ID of the telemetry data; identifying, based on the database, the time of last request associated with the particular client ID and the particular datatype ID; determining an elapsed time between the time of last request and the timestamp of the request; determining that the collection frequency is not greater than the elapsed time, and in response: collecting the particular telemetry data from one or more computing hardware; providing the collected particular telemetry data to the client computing module; and performing, at the client computing module and based on the collected particular telemetry data, a remediation action at the computing hardware of the information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Figure 2:
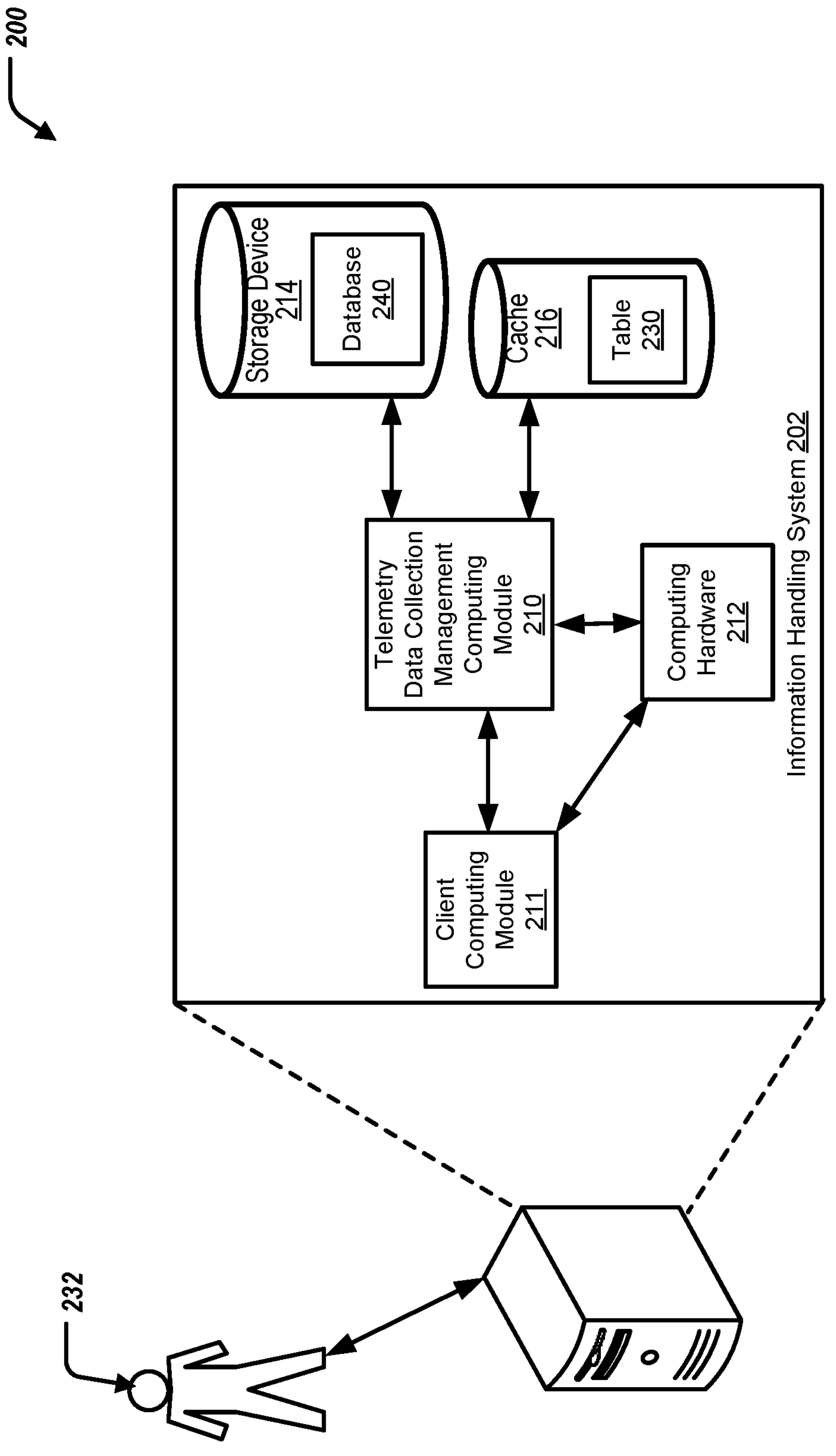
FIG. 2 illustrates a block diagram of an information handling system for scheduling telemetry data collection.
Figure 3:
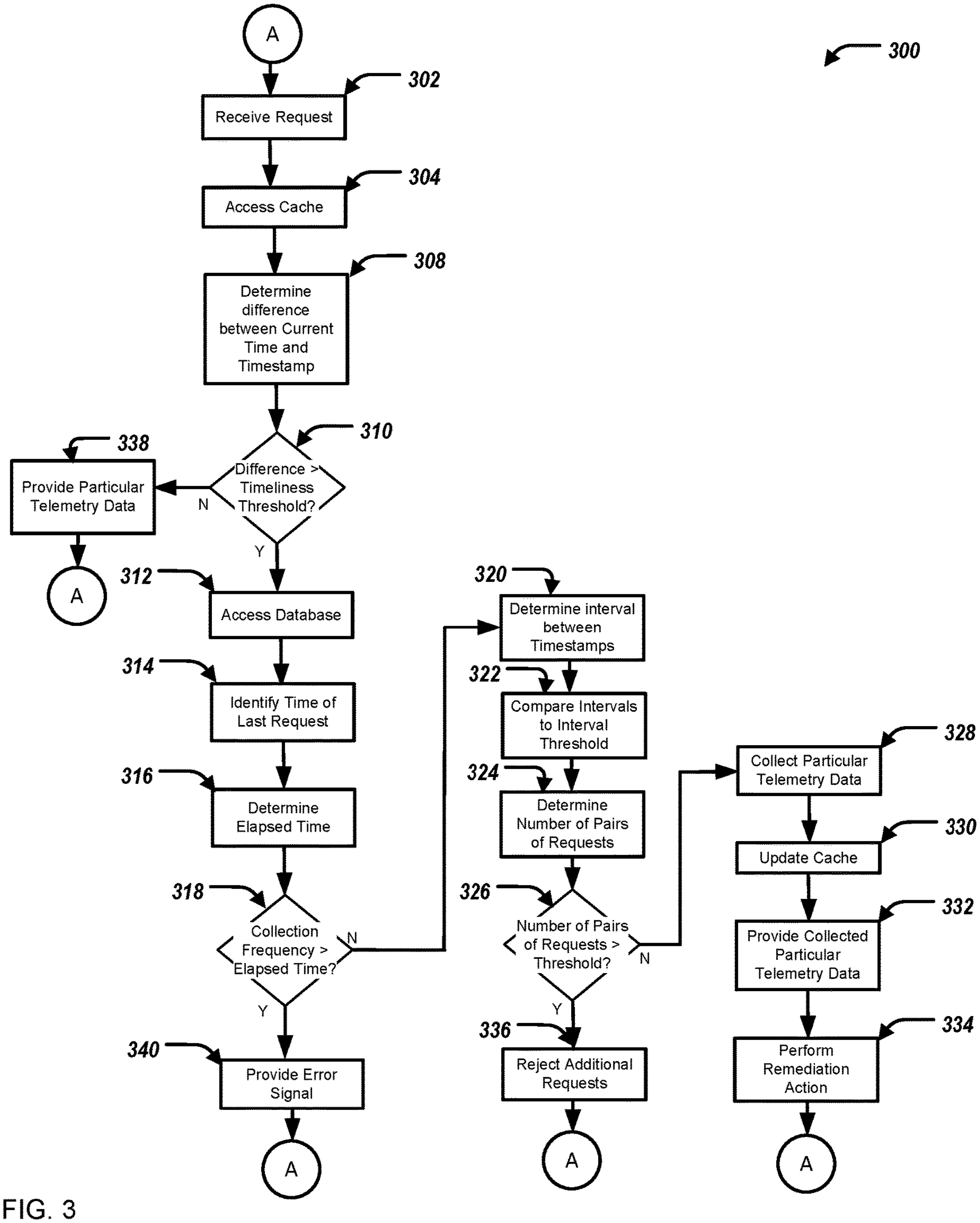
FIG. 3 illustrates a method for scheduling telemetry data collection.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include one or more processing resources such as a central processing unit (CPU), microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system 100). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, a camera, or another type of peripheral device.

Local storage resource 150 may comprise computer-readable media (e.g., hard disk drive, floppy disk drive, CD-ROM, and/or other types of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), a personal area network (PAN), a local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet, or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Turning to FIG. 2, FIG. 2 illustrates an environment 200 including an information handling system 202. The information handling system 202 can include a telemetry data collection management computing module 210, a client computing module 211, computing hardware 212, a storage device 214, and cache 216. In some examples, the information handling system 202 is similar to, or includes, the information handling system 100 of FIG. 1.

The telemetry data collection management computing module 210 can be in communication with the client computing module 211, the computing hardware 212, the storage device 214, and the cache 216. The client computing module 211 can be in communication with the telemetry data collection management computing module 210 and the computing hardware 212. The computing hardware 212 can be in communication with the client computing module 211 and the telemetry data collection management computing module 210.

The computing hardware 212 can include memory, storage devices, video cards, audio cards, processors, and the like.

In short, computing applications using a common telemetry agent may aim to collect data types periodically but might do so inappropriately. Some applications treat the telemetry agent as a library, making a series of on-demand calls managed by their own timers. This approach reduces the telemetry agent's ability to optimize the collection of telemetry data requested by multiple applications. The application may be aware of the periodic collection of the telemetry data and also may attempt to bypass such collection frequency. The application may use a timer to initiate discrete on-demand telemetry data requests ("calls"), thereby causing the negative impact that the telemetry agent aims to prevent. The present invention implements a protection algorithm to detect accidental or intentional misuse of telemetry data requests. This prevents circumvention of system-level telemetry collection strategies, heuristics, and safeguards.

FIG. 3 illustrates a flowchart depicting selected elements of an embodiment of a method 300 for scheduling telemetry data collection. The method 300 may be performed by the information handling system 100, the information handling system 202, the telemetry data collection management computing module 210 and/or the client computing module 211, and with reference to FIGS. 1-2. It is noted that certain operations described in method 300 may be optional or may be rearranged in different embodiments.

The telemetry data collection management computing module 210 receives, from the client computing module 211, a request, at 302. The request can be for particular telemetry data associated with the computing hardware 212. The telemetry data can represent properties, parameters, and the like, of the computing hardware 212. For example, the telemetry data can include processor parameters, temperature of the computing hardware 212, processing parameters of the computing hardware 212, data access parameters of memory, battery information, battery state, network performance parameters and speed, BIOS version, OS version, and the like. The request can include data indicating a particular client identifier (ID) of the client computing module 211, a particular datatype ID of the telemetry data that is being requested, a timeliness threshold of the telemetry data that is being requested, and a timestamp of the request. The timeliness threshold of the telemetry data indicates a length of time from the current time of the request (timestamp) (or time window) for the time associated with the particular telemetry data. For example, the timeliness threshold can indicate 5 minutes, and thus, the time associated with the particular telemetry data should be within the last 5 minutes, described further herein. In other words, the timeliness threshold can indicate a "freshness" threshold of the particular telemetry data.

The telemetry data collection management computing module 210, in response to receiving the request, accesses the cache 216, at 304. The cache 216 can include a plurality of telemetry data (e.g., values of the telemetry data). The cache 216 can indicate for each of the telemetry data stored by the cache 216, a respective timestamp of the telemetry data. The timestamp of the telemetry data can indicate a time when the telemetry data was obtained (e.g., from the computing hardware 212). The cache 216 can store the telemetry data (the values of the telemetry data) and the associated timestamps for each telemetry data at a table 230.

The telemetry data collection management computing module 210, after accessing the cache 216, determines a difference between a current time and the timestamp of the particular telemetry data, at 308. The telemetry data collection management computing module 210 can determine the difference between the current time and the timestamp of the particular telemetry data as a period of time (e.g., 1 minute, 5 minutes, 1 hour).

The telemetry data collection management computing module 210 can determine whether the difference between the current time and the timestamp of the particular telemetry data is greater than the timeliness threshold, at 310. In some examples, the telemetry data collection management computing module 210 determines that the difference between the current time and the timestamp of the particular telemetry data is greater than the timeliness threshold (at 310). For example, the difference between the current time and the timestamp of the particular telemetry data is 1 hour; and the timeliness threshold is 5 minutes. Thus, the difference between the current time and the timestamp of the particular telemetry data (1 hour) is greater than the timeliness threshold (5 minutes).

In response to determining that the difference between the current time and the timestamp of the particular telemetry data is greater than the timeliness threshold (at 310), the telemetry data collection management computing module 210 accesses a database 240, at 312. The database 240 is stored by the storage device 214. The database 240 includes, for each telemetry data, a collection frequency associated with the telemetry data. Specifically, the database 240 can include data indicating the plurality of telemetry data, and for each telemetry data, a collection (or sampling) frequency of the telemetry data. For example, for telemetry data A, the database 240 can indicate a collection frequency Z; and for telemetry data B, the database 240 can indicate a collection frequency Y; and so forth. The collection frequency of each telemetry data can indicate how often each telemetry data is collected/sampled by the telemetry data collection management computing module 210. For example, the collection frequency can be 1 minute, 1 hour, or 1 day. The database 240 can include data indicating the collection frequency for each datatype of telemetry data.

The database 240 can further include, for each combination of client ID of a plurality of client IDs and datatype ID of a plurality of datatype IDs, a time of each request by the client ID for the datatype ID of the telemetry data, including the time of the last request. That is, for each datatype ID (of telemetry data), the database 240 can indicate the client ID that has requested the telemetry data corresponding to the datatype ID, and the time of the last request.

The telemetry data collection management computing module 210 identifies, based on the database 240, the time of the last request associated with the particular client ID of the client computing module 211 and the particular datatype ID of the requested telemetry data, at 314. That is, the telemetry data collection management computing module 210 identifies, for the client computing module 211, the last time of request (prior to the instant request) of the particular telemetry data associated with the request received at 302. For example, the time of last request can be associated with a particular date and time.

The telemetry data collection management computing module 210 can determine an elapsed time between the time of the last request and the timestamp of the request, at 316. Specifically, the telemetry data collection management computing module 210 can determine the elapsed time between the time of the last request of the particular telemetry data (from the client computing module 211 and as indicated by the database 240) and the timestamp of the current request received from the client computing module 211 (at 302). For example, the elapsed time can be 20 minutes.

The telemetry data collection management computing module 210 can determine whether the collection frequency is greater than the elapsed time, at 318. That is, the telemetry data collection management computing module 210 can determine whether the collection frequency associated with the particular telemetry data is greater than the elapsed time between the time of the last request of the particular telemetry data (from the client computing module 211 and as indicated by the database 240) and the timestamp of the current request received (from the client computing module 211 at 302) (at 318).

In some examples, the telemetry data collection management computing module 210 determines that the collection frequency is not greater than the elapsed time (the collection frequency is less than the elapsed time) (at 318), and in response, the telemetry data collection management computing module 210 can determine an interval between the times (as stored by the database 240) of each pair of (consecutive) requests as stored by the database 240 of a sliding time window, at 320.

The telemetry data collection management computing module 210 can compare the interval of each pair of (consecutive) requests of the sliding time window to an interval threshold, at 322. The telemetry data collection management computing module 210 determines a number of pairs of (consecutive) requests of the sliding time window where the interval of the pair of requests is less than the interval threshold, at 324. The telemetry data collection management computing module 210 can then determine whether the number of pairs of requests of the sliding time window (where the interval of the pair of requests is less than the interval threshold) is greater than a quantity threshold, at 326. That is, the telemetry data collection management computing module 210 determines whether there are a threshold number of pairs of requests that having an interval greater than a threshold (the pairs of requests are "close" in time).

In some examples, the telemetry data collection management computing module 210 determines that the number of pairs of requests of the sliding time window (where the interval of the pair of request is less than the interval threshold) is less than the quantity threshold (at 326), and in response, collects the particular telemetry data from the computing hardware 212, at 328. That is, the telemetry data collection management computing module 210 obtains the particular telemetry data from the appropriate computing hardware 212 (the telemetry data collection management computing module 210 provides a request to the appropriate computing hardware 212 for the particular telemetry data, and in response, receives the particular telemetry data from the appropriate computing hardware 212).

The telemetry data collection management computing module 210, updates the cache 216 with the collected particular telemetry data and the timestamp of the collected particular telemetry data, at 330. That is, the telemetry data collection management computing module 210 updates the cache 216 to indicate for the particular telemetry data, the updated value of the collected particular telemetry data and the timestamp that the collected particular telemetry data was collected from the computing hardware 212.

The telemetry data collection management computing module 210 provides the collected particular telemetry data to the client computing module 211, at 332. That is, in response to the request from the client computing module 211 (at 302), the telemetry data collection management computing module 210 provides the collected particular telemetry data to the client computing module 211.

The client computing module 211 performs, based on the collected particular telemetry data, a remediation action at the computing hardware 212, at 334. The client computing module 211 can perform the remediation action at the computing hardware 212 in response to receiving the collected particular telemetry data.

The client computing module 211 performs the remediation action independent of user action by a user 232 of the information handling system 202. That is, the client computing module 211 performs the remediation action at the information handling system 202 (and specifically, at the computing hardware 212) automatically in response to receiving the collected particular telemetry data. The client computing module 211 can perform the remediation action (or remediation actions) to provide operability of the computing features of the computing hardware 212 by improving performance capabilities of the information handling system 202 (such as the computing hardware 212). That is, performing the remediation action(s) to the computing hardware 212 by the client computing module 211 improves the performance capabilities of the information handling system 202 (the computing hardware 212) such that the functionality and the operability of the computing features of the computing hardware 212 is improved. In some examples, the client computing module 211 can perform the remediation action (or remediation actions) to improve the performance capabilities of the information handling system 202 without user action/input by the user 232 (independent of user action/input by the user 232).

In some examples, the client computing module 211, in response to receiving the collected particular telemetry data, can perform the corrective action of uninstalling a driver associated with the computing hardware 212 without input/interaction by the user 232. That is, the client computing module 211 can uninstall, or facilitate uninstallation of, the driver at the computing hardware 212 automatically in response to receiving the collected particular telemetry data.

In some examples, the client computing module 211, in response to receiving the collected particular telemetry data, can perform the corrective action of updating a driver associated with the computing hardware 212 without input/interaction by the user 232. That is, the client computing module 211 can update, or facilitate updating of, the driver at the computing hardware 212 automatically in response to receiving the collected particular telemetry data.

In some examples, the client computing module 211, in response to receiving the collected particular telemetry data, can perform the corrective action of disabling a driver associated with the computing hardware 212 without input/interaction by the user 232. That is, the client computing module 211 can disable, or facilitate disabling of, the driver at the computing hardware 212 automatically in response to receiving the collected particular telemetry data.

In some examples, the client computing module 211, in response to receiving the collected particular telemetry data, can perform the corrective action of installing a new driver associated with the computing hardware 212 without input/interaction by the user 232. That is, the client computing module 211 can install, or facilitate installing of, the new driver at the computing hardware 212 automatically in response to receiving the collected particular telemetry data.

In some examples, the client computing module 211, in response to receiving the collected particular telemetry data, can perform the corrective action of updating firmware associated with the computing hardware 212 without input/interaction by the user 232. That is, the client computing module 211 can update, or facilitate updating of, the firmware at the computing hardware 212 automatically in response to receiving the collected particular telemetry data.

In some examples, the client computing module 211, in response to receiving the collected particular telemetry data, can perform the corrective action of updating a configuration associated with the computing hardware 212 without input/ interaction by the user 232. That is, the client computing module 211 can update, or facilitate updating of, the configuration at the computing hardware 212 automatically in response to receiving the collected particular telemetry data.

In some examples, the telemetry data can include a type of power-AC or battery. In some examples, the client computing module 211, in response to receiving the collected particular telemetry data that indicates the power source of the information handling system 202 is AC power, can perform the remediation action of disabling any battery related operations, such as battery-related data operations for determining a health of the battery without input/interaction by the user 232.

In some examples, the telemetry data can include a type of power-AC or battery. In some examples, the client computing module 211, in response to receiving the collected particular telemetry data that indicates the power source of the information handling system 202 is battery power, can perform the remediation action of disabling or throttling power intensive applications and computing hardware, such as determination of the network utilization, display properties such as brightness, and processing speed of computing hardware without input/interaction by the user 232.

In some examples, the telemetry data can include a hinge angle. In some examples, the client computing module 211, in response to receiving the collected particular telemetry data that indicates the hinge angle of the information handling system 202 (between bodies of the information handling system 202), can perform the remediation action of adjusting a display state of the information handling system 202 without input/interaction by the user 232.

In some examples, the telemetry data can include a network connectivity state (Wi-Fi, Ethernet, Cellular). In some examples, the client computing module 211, in response to receiving the collected particular telemetry data that indicates the network connectivity state of the information handling system 202, can perform the remediation action of adjusting network transmission rates without input/interaction by the user 232.

In some examples, the telemetry data collection management computing module 210 determines that the number of pairs of (consecutive) requests of the sliding time window (where the interval of the pair of request is less than the interval threshold) is greater than the quantity threshold (at 326), and in response, rejects additional requests for the particular telemetry data from the client computing module 211, at 336. That is, the client computing module 211 is requesting the particular telemetry data too quickly in succession, and in response, provides an error signal to the client computing module 211 indicating such, and/or rejects additional requests for the particular telemetry data from the client computing module 211. That is, for every sliding window of pairs of timestamps of the requests from the client computing module 211, the interval between the requests is determined. When the telemetry data collection management computing module 210 determines that a threshold percentage of windows are within a threshold interval, the telemetry data collection management computing module 210 rejects further requests from the client computing module 211 for the particular telemetry data.

In some examples, the telemetry data collection management computing module 210 can update the database 240 to indicate the timestamp of the request for the client ID and the datatype ID. That is, the telemetry data collection management computing module 210 can update the database 240 to indicate for the particular telemetry data of the request (at 302), the timestamp of the request for the client ID of the client computing module 211.

In some examples, the telemetry data collection management computing module 210 determines that the difference between the current time and the timestamp of the particular telemetry data is less than the timeliness threshold (at 310). For example, the difference between the current time and the timestamp of the particular telemetry data is 2 minutes; and the timeliness threshold is 5 minutes. Thus, the difference between the current time and the timestamp of the particular telemetry data (2 minutes) is less than the timeliness threshold (5 minutes). In response to determining that the difference between the current time and the timestamp of the particular telemetry data is less than the timeliness threshold (at 310), the telemetry data collection management computing module 210 provides the particular telemetry data to the client computing module 211, at 338. That is, in response to the request from the client computing module 211 (at 302), the telemetry data collection management computing module 210 provides the particular telemetry data from the cache 216 (accessed at 304).

In some examples, the telemetry data collection management computing module 210 determines that the collection frequency is greater than the elapsed time (at 318), and in response, provides an error signal to the client computing module 211, at 340. That is, the telemetry data collection management computing module 210 can determine that the collection frequency associated with the particular telemetry data (at 312) is greater than the elapsed time between the time of the last request of the particular telemetry data (from the client computing module 211 and as indicated by the database 240) and the timestamp of the current request received (from the client computing module 211 at 302). In other words, the client computing module 211 is requesting the particular telemetry data too quickly (faster than the collection frequency), and in response, provides an error signal to the client computing module 211 indicating such.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A computer-implemented method of scheduling telemetry data collection for an information handling system, including:

receiving, from a client computing module, a request for particular telemetry data, the request including a particular client identifier (ID) of the client computing module, a particular datatype ID of the particular telemetry data, a timeliness threshold of the particular telemetry data, and a timestamp of the request;

in response to the request, accessing a cache, the cache including a plurality of telemetry data, each plurality of telemetry data associated with a respective timestamp;

determining that a difference between a current time and the timestamp of the particular telemetry data is greater than the timeliness threshold, and in response:

accessing a database, the database including:

for each telemetry data, a collection frequency associated with the telemetry data;

for each combination of client ID of a plurality of client IDs and datatype ID of a plurality of datatype IDs, a time of last request by the client ID for the datatype ID of the telemetry data;

identifying, based on the database, the time of last request associated with the particular client ID and the particular datatype ID;

determining an elapsed time between the time of last request and the timestamp of the request;

determining that the collection frequency is not greater than the elapsed time, and in response:

collecting the particular telemetry data from one or more computing hardware;

providing the collected particular telemetry data to the client computing module; and performing, at the client computing module and based on the collected particular telemetry data, a remediation action at the computing hardware of the information handling system.

2. The computer-implemented method of claim 1, further including:

in response to determining that the collection frequency is not greater than the elapsed time, updating the cache with the collected particular telemetry data and the timestamp of the collected particular telemetry data.

3. The computer-implemented method of claim 1, further including:

updating the database to indicate the timestamp of the request for the client ID and the datatype ID.

4. The computer-implemented method of claim 1, further including:

determining that a difference between a current time and the timestamp of the particular telemetry data is less than the timeliness threshold, and in response, providing the particular telemetry data from the cache to the client computing module.

5. The computer-implemented method of claim 1, further including:

determining that the collection frequency is greater than the elapsed time, and in response, providing an error signal to the client computing module.

6. The implemented method of claim 1, further including:

determining an interval of each pair of consecutive requests from the client computing device from a sliding time window;

comparing the interval of each pair of consecutive requests to an interval threshold;

determining a number of pairs of consecutive requests of the sliding time window that are greater than the interval threshold;

comparing the number of pairs of consecutive requests of the sliding time window to a quantity threshold; and determining that the number of pairs of consecutive request of the sliding time window is less than the quantity threshold, and in response, collecting the particular telemetry data from one or more computing hardware.

7. The computer-implemented method of claim 1, further including:

determining an interval of each pair of consecutive requests from the client computing device from a sliding time window;

comparing the interval of each pair of consecutive requests to an interval threshold;

determining a number of pairs of consecutive requests of the sliding time window that are greater than the interval threshold;

comparing the number of pairs of consecutive requests of the sliding time window to a quantity threshold; and determining that the number of pairs of consecutive request of the sliding time window is greater than the quantity threshold, and in response, rejecting additional requests from the client computing device.

8. An information handling system comprising a hardware processor having access to memory media storing instructions executable by the hardware processor to perform operations, comprising:

receiving, from a client computing module, a request for particular telemetry data, the request including a particular client identifier (ID) of the client computing module, a particular datatype ID of the particular telemetry data, a timeliness threshold of the particular telemetry data, and a timestamp of the request;

in response to the request, accessing a cache, the cache including a plurality of telemetry data, each plurality of telemetry data associated with a respective timestamp;

determining that a difference between a current time and the timestamp of the particular telemetry data is greater than the timeliness threshold, and in response:

accessing a database, the database including:

for each telemetry data, a collection frequency associated with the telemetry data;

for each combination of client ID of a plurality of client IDs and datatype ID of a plurality of datatype IDs, a time of last request by the client ID for the datatype ID of the telemetry data;

identifying, based on the database, the time of last request associated with the particular client ID and the particular datatype ID;

determining an elapsed time between the time of last request and the timestamp of the request;

determining that the collection frequency is not greater than the elapsed time, and in response:

collecting the particular telemetry data from one or more computing hardware;

providing the collected particular telemetry data to the client computing module; and performing, at the client computing module and based on the collected particular telemetry data, a remediation action at the computing hardware of the information handling system.

9. The information handling system of claim 8, the operations further including:

in response to determining that the collection frequency is not greater than the elapsed time, updating the cache with the collected particular telemetry data and the timestamp of the collected particular telemetry data.

10. The information handling system of claim 8, the operations further including:

updating the database to indicate the timestamp of the request for the client ID and the datatype ID.

11. The information handling system of claim 8, the operations further including:

determining that a difference between a current time and the timestamp of the particular telemetry data is less than the timeliness threshold, and in response, providing the particular telemetry data from the cache to the client computing module.

12. The information handling system of claim 8, the operations further including:

determining that the collection frequency is greater than the elapsed time, and in response, providing an error signal to the client computing module.

13. The information handling system of claim 8, the operations further including:

determining an interval of each pair of consecutive requests from the client computing device from a sliding time window; and comparing the interval of each pair of consecutive requests to an interval threshold;

determining a number of pairs of consecutive requests of the sliding time window that are greater than the interval threshold;

comparing the number of pairs of consecutive requests of the sliding time window to a quantity threshold;

determining that the number of pairs of consecutive request of the sliding time window is less than the quantity threshold, and in response, collecting the particular telemetry data from one or more computing hardware.

14. The information handling system of claim 8, the operations further including:

determining an interval of each pair of consecutive requests from the client computing device from a sliding time window;

comparing the interval of each pair of consecutive requests to an interval threshold;

determining a number of pairs of consecutive requests of the sliding time window that are greater than the interval threshold;

comparing the number of pairs of consecutive requests of the sliding time window to a quantity threshold; and determining that the number of pairs of consecutive request of the sliding time window is greater than the quantity threshold, and in response, rejecting additional requests from the client computing device.

15. A non-transitory computer-readable medium storing software comprising instructions executable by one or more computers which, upon such execution, cause the one or more computers to perform operations comprising:

receiving, from a client computing module, a request for particular telemetry data, the request including a particular client identifier (ID) of the client computing module, a particular datatype ID of the particular telemetry data, a timeliness threshold of the particular telemetry data, and a timestamp of the request;

in response to the request, accessing a cache, the cache including a plurality of telemetry data, each plurality of telemetry data associated with a respective timestamp;

determining that a difference between a current time and the timestamp of the particular telemetry data is greater than the timeliness threshold, and in response:

accessing a database, the database including:

for each telemetry data, a collection frequency associated with the telemetry data;

for each combination of client ID of a plurality of client IDs and datatype ID of a plurality of datatype IDs, a time of last request by the client ID for the datatype ID of the telemetry data;

identifying, based on the database, the time of last request associated with the particular client ID and the particular datatype ID;

determining an elapsed time between the time of last request and the timestamp of the request;

determining that the collection frequency is not greater than the elapsed time, and in response:

collecting the particular telemetry data from one or more computing hardware;

providing the collected particular telemetry data to the client computing module; and performing, at the client computing module and based on the collected particular telemetry data, a remediation action at the computing hardware of the information handling system.

16. The non-transitory computer-readable medium of claim 15, the operations further including:

in response to determining that the collection frequency is not greater than the elapsed time, updating the cache with the collected particular telemetry data and the timestamp of the collected particular telemetry data.

17. The non-transitory computer-readable medium of claim 15, the operations further including:

updating the database to indicate the timestamp of the request for the client ID and the datatype ID.

18. The non-transitory computer-readable medium of claim 15, the operations further including:

determining that a difference between a current time and the timestamp of the particular telemetry data is less than the timeliness threshold, and in response, providing the particular telemetry data from the cache to the client computing module.

19. The non-transitory computer-readable medium of claim 15, the operations further including:

determining that the collection frequency is greater than the elapsed time, and in response, providing an error signal to the client computing module.

20. The non-transitory computer-readable medium of claim 15, the operations further including:

determining an interval of each pair of consecutive requests from the client computing device from a sliding time window;

comparing the interval of each pair of consecutive requests to an interval threshold;

determining a number of pairs of consecutive requests of the sliding time window that are greater than the interval threshold;

comparing the number of pairs of consecutive requests of the sliding time window to a quantity threshold; and determining that the number of pairs of consecutive request of the sliding time window is less than the quantity threshold, and in response, collecting the particular telemetry data from one or more computing hardware.

* * * * *